UNITED STATES PATENT OFFICE.

ALLEN B. LANGSHORE, OF HAMILTON, MISSOURI.

IMPROVEMENT IN PAINT-OILS.

Specification forming part of Letters Patent No. 147,145, dated February 3, 1874; application filed July 28, 1873.

*To all whom it may concern:*

Be it known that I, ALLEN B. LANGSHORE, of Hamilton, in the county of Caldwell and State of Missouri, have invented a certain Compound called "Hydraulic Oil," to be used instead of linseed and other oils in the mixing and preparation of paints, of which the following is a specification:

The nature of my said invention consists in mixing a solution of glue dissolved in water, a solution of resin dissolved in linseed-oil, a solution of hydraulic cement, and concentrated potash with coal-oil.

To prepare the hydraulic oil, take one pint and a half linseed-oil; add six ounces pulverized resin; boil until dissolved. Dissolve six ounces of glue in one pint of water by means of a water-bath. When the glue solution is cold, add to it one ounce of concentrated potash, and stir until the potash is dissolved. Pour the two solutions together and stir thoroughly to mix. Then take three pounds of hydraulic cement; add four and one-half pints of soft water; mix thoroughly, and let the mixture stand long enough for the gritty substance to settle. Then pour off to make three and one-half pints; add this to the last mixture, and, after all are well mixed, add one pint of coal-oil. In the place of concentrated potash, pearl-ash or any similar ingredient may be used.

Paints mixed with this compound dry quicker, spread easier, cover more surface, give a better gloss, last longer, and are more impervious to fire than when mixed with linseed-oil, while the compound costs less than one-fourth as much.

I claim as my invention—

The manufacture and preparation of a compound, which is denominated "hydraulic oil," of the ingredients, in the proportions, and for the purposes substantially as set forth in the foregoing specification.

ALLEN B. LANGSHORE.

Witnesses:
 MARCUS A. LOW,
 B. M. DILLEY.